A. J. ROWLEDGE.
FLUID TIGHT PLUG OR SOCKET.
APPLICATION FILED SEPT. 10, 1917.
1,312,001.
Patented Aug. 5, 1919.
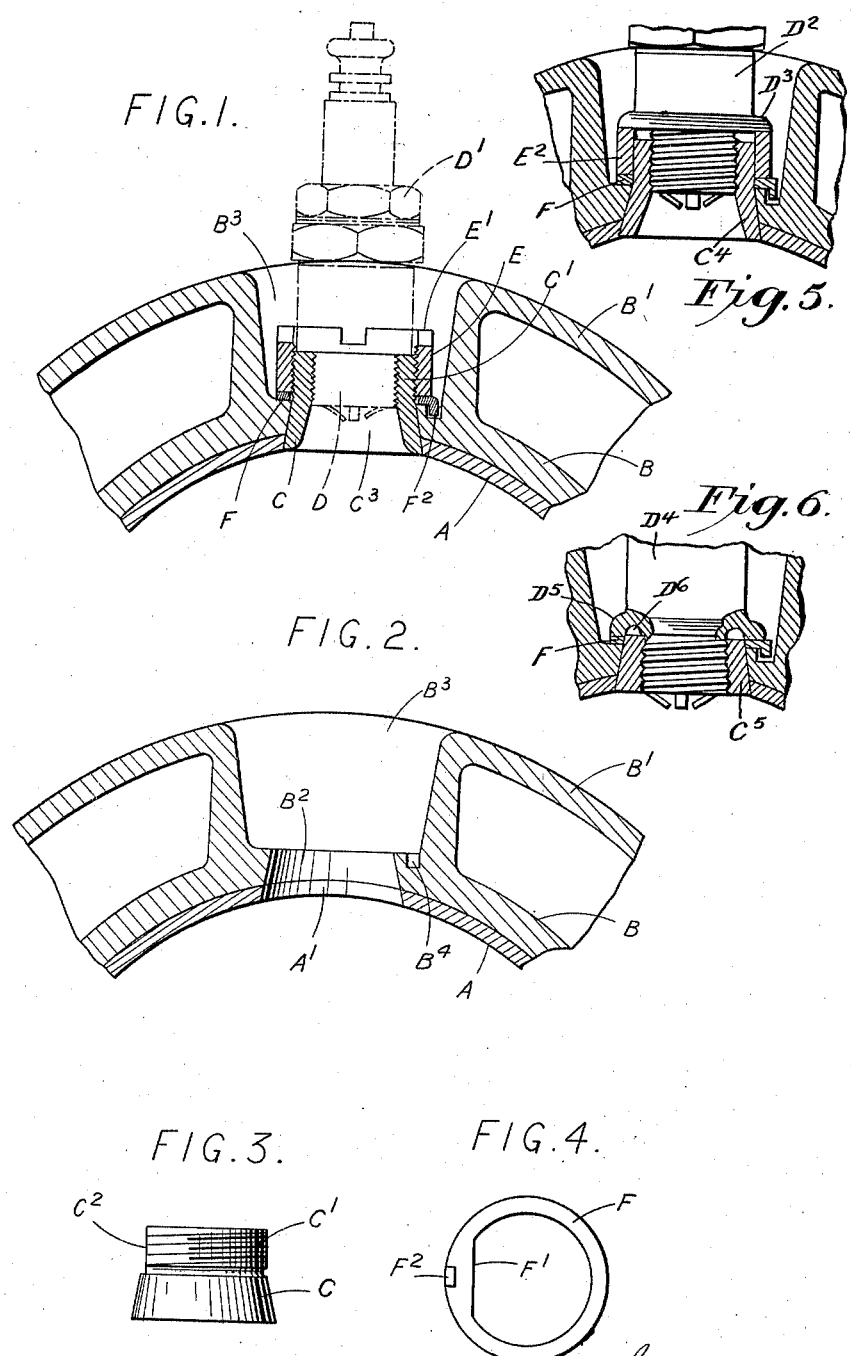

UNITED STATES PATENT OFFICE.

ARTHUR JOHN ROWLEDGE, OF LONDON, ENGLAND, ASSIGNOR TO D. NAPIER & SON LIMITED, OF LONDON, ENGLAND.

FLUID-TIGHT PLUG OR SOCKET.

1,312,001. Specification of Letters Patent. Patented Aug. 5, 1919.

Application filed September 10, 1917. Serial No. 190,644.

*To all whom it may concern:*

Be it known that I, ARTHUR JOHN ROWLEDGE, subject of the King of England, residing at London, in England, have invented certain new and useful Improvements in Fluid-Tight Plugs or Sockets, of which the following is a specification.

This invention relates to fluid-tight plugs or sockets for use in the cylinders of internal combustion engines more particularly for the purpose of fixing sparking plugs.

In the case of an internal combustion engine cylinder which has a water jacket formed separately from and applied to a liner which constitutes the cylinder, where an opening in the wall of the cylinder is made for the insertion of a sparking plug or pipe it is necessary to effectually seal the joint between the liner and the wall of the water jacket about the opening. At the same time the opening must be provided with a screw-threaded lining to permit of the insertion of the sparking plug or pipe end or union. By means of the present invention such a joint is made and the necessary lining for the opening is provided in a simple and effective manner.

According to this invention a hollow socket is provided the interior of which is wholly or partly screw-threaded while the exterior is formed conical as to the whole or a part of its length the conical portion being ground to fit a tapered hole which runs through the cylinder liner and the contiguous wall of the water jacket. A separate flange or sleeve-like member is provided, or the sparking plug or pipe connection which is to be screwed into the hollow socket is formed or combined with a similarly acting part and this flange, sleeve, nut or similar member is forced by screw-action directly or indirectly against the outer face of the water jacket while the conical portion of the socket is simultaneously drawn toward it into the hole so as to seal the joint around it and clamp the contiguous parts together. In the preferred construction the plug or socket is formed conical for only part of the length of its exterior the other part being formed cylindrical and screw-threaded. A nut engages this screw-threaded portion and when this nut is screwed up against the wall of the water jacket the conical portion of the socket is simultaneously drawn into the hole so that the joint around the hole is sealed by the wall of the socket and by the action of the nut in drawing together the two contiguous walls around the hole.

The invention may be applied and put into practice in various ways and the details of construction may vary in accordance with requirements. The following, however, may be instanced as a convenient arrangement. A recess is formed in the water jacket so that the bottom of this recess is comprised by a single wall or thickness of metal which lies against the wall of the liner constituting the cylinder within the water jacket. A hole is formed at the bottom of the recess through the contiguous walls and this hole is tapered so as to be of somewhat larger diameter at its inner end than at its outer end. The bottom of the recess about the hole is formed flat. A hollow plug or socket is provided whose exterior is as to approximately half its length cylindrical and screw-threaded while as to the other part of its length the exterior is formed as a cone adapted to fit the conical or tapered hole in the cylinder wall. The socket is preferably ground to fit this hole. The length of the conical portion of the socket is substantially equal to the thickness of the double wall through which the socket passes so that the cylindrical and screw-threaded part of the socket projects into the recess in the water jacket. A nut is screwed on to this projecting portion of the socket and when screwed home exerts pressure against the bottom of the recess about the opening and draws the plug into this opening. The two walls are thus drawn or clamped together by the socket and by this means and by the close fitting of the socket in the hole the joint between the contiguous walls of the cylinder and water jacket is effectually sealed. The construction of the nut may vary in accordance with requirements but conveniently it is castellated and the dimensions of the nut and that portion of the socket which projects into the recess are such that the end of the socket and the nut when screwed home lie well within this recess. The hole through the socket is wholly or partly cylindrical and screw-threaded and into this hole can be screwed a sparking plug or pipe connection.

According to an alternative arrangement in place of drawing the socket into the hole and sealing the joint by means of a nut screwed directly on to the socket as described above a sleeve or collar may be provided which will fit on to the projecting end of the socket which in this case need not be screw-threaded on its exterior. The sparking plug which is to be screwed into the socket is then provided with a flange or so formed that when screwed into the hollow socket a part of the sparking plug will project around the outer end of the socket and bear against the outer end of the sleeve. Thus when the sparking plug or pipe is screwed into the hollow socket the sleeve will be forced against the wall of the water jacket around the socket and the latter will be drawn into the hole and the joint around the hole sealed.

Then again the socket may be formed conical throughout the whole of its exterior the length of the socket being only such as to be substantially equal to the thickness of the two contiguous walls through which the socket passes. The sparking plug or pipe which is to be screwed into the socket is then formed with a flange or otherwise of greater diameter than the hollow socket so as to directly bear against the wall of the water jacket around the opening when the sparking plug is screwed into the hollow socket. In this case the sparking plug itself by bearing against the wall of the water jacket as it is screwed home draws the hollow socket home and seals the joint.

In order to prevent the hollow socket from rotating in the hole in the cylinder and water jacket walls when the nut or other member is being screwed on or into the socket, some device may be provided which will key the plug to the cylinder walls in such a way as not to interfere with the drawing of the socket into the hole. For example, a washer or the like may be employed which is adapted to fit over and engage the outer end of the socket and at the same time engage the water jacket wall. Thus the washer may have a lug or tooth which projects into the opening of the washer and engages a corresponding keyway cut in the outer end of the socket. The washer may also have another lug or projection formed on its outer periphery to engage a corresponding hole or notch in the bottom or side of the recess in the water jacket in which the socket is fitted. This washer thus serves to connect the socket to the wall surrounding it in such a manner as to prevent the socket from rotating while being drawn home. The washer may have more than one inwardly projecting lug and also more than one outwardly directed projection and the latter may be downturned or otherwise formed or arranged to effect the desired engagement with the water jacket and cylinder. Corresponding keyways are formed in the end of the socket in accordance with the number and dispositions of the lugs provided to engage them.

The accompanying drawings illustrate one construction in accordance with this invention. In these drawings;

Figure 1 is a sectional elevation showing an adapter for a sparking plug as used in the cylinder of an internal combustion engine the section being taken transverse to the axis of the cylinder and showing a portion of the cylinder wall.

Fig. 2 is a similar view showing the formation of the opening in the cylinder wall in which opening the improved adapter is inserted.

Fig. 3 is an elevation of the hollow adapter plug or socket.

Fig. 4 is an underside view of the washer employed to prevent the adapter plug or socket from rotating.

Figs. 5 and 6 are sectional elevations similar to Fig. 1 illustrating modified forms of the invention.

Like letters indicate like parts throughout the drawings.

The construction and fitting of a sparking plug adapter for an internal combustion engine according to the present invention is more especially intended to be used in a cylinder which comprises a steel liner inserted and fixed in some convenient manner in a water jacket formed of aluminium or aluminium alloy. Referring to the drawings the steel cylinder or liner A is inserted and fixed in some suitable manner within the water jacket which comprises an inner wall B and an outer wall B'. At the place where it is desired to dispose the sparking plug there is formed an opening A' in the wall of the liner A and a corresponding opening B² is formed in the water jacket this latter opening being arranged at the bottom of a recess B³ wherein the outer wall B' of the water jacket is carried down and merged in the inner wall B. The double opening A' B² is formed conical the outer portion being of less diameter than the inner portion. A hollow plug or socket of suitable dimensions has one portion C of its exterior formed conical and ground to fit the double opening A' B². The remainder C' of the exterior of the socket is cylindrical except for a flat C² formed along one side. The opening $C^3$ through the socket may be cylindrical throughout or as shown it may be partly cylindrical while the inner end is enlarged by tapering the wall of the socket. The cylindrical portion of the hole is screw-threaded to receive the usual screw-threaded end portion D of a sparking plug D' of some known type. The length of the conical portion C of the hollow socket is substantially equal to the thickness of the double wall A, B, at the opening A' $B^2$. The cylindrical portion C' of the socket is screw-threaded externally and of sufficient length to receive a nut or screw-threaded sleeve E provided with a castellated head or end E' adapted to receive a suitable spanner or tool by means of which the nut can be screwed home on the socket C C'. A washer F is slipped over the cylindrical end C' of the hollow socket beneath the nut E. This washer has an inwardly directed flat F' adapted to engage the flat $C^2$ formed on the socket C C'. The washer is also provided with a tongue or tab $F^2$ which is downwardly directed and adapted to engage a hole $B^4$ formed in the bottom of the recess $B^3$ in the water jacket and at one side of the opening $B^2$. Thus when the socket C C' is in place in the double opening A' $B^2$ and the washer F is slipped over it with the tongue or projection $F^2$ engaging the hole $B^4$ the socket will be held by the washer so that it cannot be rotated as the nut E is screwed home on the socket. By screwing up this nut E the conical portion C of the socket is drawn into the double opening A' $B^2$ and the pressure exerted by the nut E through the washer F on the wall B of the water jacket around the opening $B^2$ causes the device to effectually draw and clamp together the contiguous walls A and B of the liner and water jacket respectively. The sparking plug D D' can then be screwed home into the socket C C' the latter being held securely so as to permit of this and equally to permit of the removal of the sparking plug when desired.

Where employed otherwise than that more particularly described above it may be convenient to form the member which is to be screwed into the socket C C' with a flange or projecting part so formed that when this member is screwed into the hollow socket the projecting part of the member will bear against the wall around the opening $B^2$ either directly or through a suitable washer and the action of screwing the member into the socket will simultaneously draw the socket into the hole. Thus, as illustrated in Fig. 5, the socket $C^4$ may have a conical section similar to that shown in Fig. 3, but the external surface of the cylindrical section is smooth not being threaded, and the spark plug or pipe fitting $D^2$ is provided with a flange $D^3$ designed to bear on the top of the ring $E^2$ which is similar to E except that it is not threaded on the exterior of the socket. Rotation of the socket $C^4$ may be prevented in any desired manner. As shown, a washer F previously described is provided for this purpose. It will be observed that as the member $D^2$ is screwed into the socket $C^4$, the flange $D^3$ will bear against the ring $E^2$ so that the result of screwing in the member $D^2$ will be to draw the socket firmly to its seat.

In Fig. 6 the socket $C^5$ is shorter than in the forms already described, and is threaded internally for a spark plug or fitting $D^4$. This member $D^4$ is formed with a flange $D^5$ bearing against the washer F which engages the socket $C^5$ and holds it against rotation. An annular groove $D^6$ is formed between the flange $D^5$ and the threaded portion of the member $D^4$ so that in screwing down the member $D^4$ it will not bear against the upper edge of the socket $C^5$.

What I claim as my invention and desire to secure by Letters Patent is:—

1. The combination with the cylinder of an internal combustion motor having a conical opening through its wall, of a fluid tight socket having a conical periphery fitted in said opening, and means for forcing said socket into said opening including a member threaded to said socket, and means to hold the socket against rotation, as the member is screwed up.

2. In a fluid tight socket for use with the cylinder of an internal combustion engine the combination of a cylinder having a conical hole through its wall, a hollow socket having a screw-threaded interior and its exterior formed partly conical to engage the hole in the cylinder wall and partly cylindrical and screw-threaded, the screw-threaded portion projecting from the cylinder wall, a member screw-threaded to engage the exterior of the projecting portion of the hollow socket and so formed that as the member is screwed on to the socket the member will exert pressure on the cylinder wall around the hole and draw the socket into the hole, and means for holding the socket against rotation as the member is screwed up as set forth.

3. In a fluid tight socket for use with the cylinder of an internal combustion engine the combination of a cylinder comprising a liner and a separate water jacket and having a conical hole formed through the contiguous walls of the liner and water jacket, a hollow socket having a conical exterior adapted to engage the hole through the walls of the liner and water jacket, and a member threaded to said hollow socket and so formed that as the member and the socket are screwed together the member will exert pressure on the wall of the water jacket around the hole and draw the socket into the hole and clamp together the contiguous walls of the liner and water jacket as set forth.

4. In a fluid tight socket for use with the cylinder of an internal combustion engine the combination of a cylinder comprising a liner and a separate water jacket and having a conical hole formed through the contiguous walls of the liner and water jacket, a hollow socket having a conical exterior adapted to engage the hole through the walls of the liner and water jacket, a member threaded on said hollow socket and so formed that as the member and the socket are screwed together the member will exert pressure on the wall of the water jacket around the hole and draw the socket into the hole and clamp together the contiguous walls of the liner and water jacket, and means for holding the socket against rotation as the member is screwed up as set forth.

5. In a fluid tight socket for use with the cylinder of an internal combustion engine the combination of a cylinder comprising a liner and a separate water jacket and having a conical hole formed through the contiguous walls of the liner and water jacket, a hollow socket having a screw-threaded interior and its exterior formed partly conical to engage the hole through the walls of the liner and water jacket and partly cylindrical and screw-threaded, the screw-threaded portion projecting from the wall of the water jacket and a member screw-threaded to engage the exterior of the projecting portion of the hollow socket and so formed that as the member is screwed on to the socket the member will exert pressure on the wall of the water jacket around the hole and draw the socket into the hole and clamp together the contiguous walls of the liner and water jacket as set forth.

6. In a fluid tight socket for use with the cylinder of an internal combustion engine the combination of a cylinder comprising a liner and a separate water jacket and having a conical hole formed through the contiguous walls of the liner and water jacket, a hollow socket having a screw-threaded interior and its exterior formed partly conical to engage the hole through the walls of the liner and water jacket and partly cylindrical and screw-threaded, the screw-threaded portion projecting from the wall of the water jacket, a member screw-threaded to engage the exterior of the projecting portion of the hollow socket and so formed that as the member is screwed on to the socket the member will exert pressure on the wall of the water jacket around the hole and draw the socket into the hole and clamp together the contiguous walls of the liner and water jacket, and means for holding the socket against rotation as the member is screwed up as set forth.

7. In a fluid tight socket for use with the cylinder of an internal combustion engine the combination of a cylinder comprising a liner and a separate water jacket, a recess formed in the water jacket in the bottom of which is a conical hole through the wall of the water jacket and through the contiguous wall of the liner, a hollow socket having a screw-threaded interior and its exterior formed partly conical to engage the hole through the walls of the liner and water jacket and partly cylindrical and screw-threaded, the screw-threaded portion projecting into the recess in the water jacket, a member screw-threaded to engage the exterior of the projecting portion of the hollow socket and so formed that as the member is screwed on to the socket the member will exert pressure on the wall of the water jacket around the hole and draw the socket into the hole and clamp together the contiguous walls of the liner and the water jacket, and means for holding the socket against rotation as the member is screwed up as set forth.

8. In a fluid tight socket for use with the cylinder of an internal combustion engine the combination of a cylinder having a conical hole through its wall, a hollow socket having a screw-threaded interior and its exterior formed partly conical to engage the hole in the cylinder wall and partly cylindrical and screw-threaded, the screw-threaded portion projecting from the cylinder wall, a washer non-rotatively engaging both the projecting portion of the socket which it surrounds and also the adjacent wall of the cylinder, and a member threaded on the exterior of the projecting portion of the hollow socket and so formed that as the member is screwed on to the socket the member will bear on the washer which lies against the cylinder wall around the hole and draw the socket into the hole as set forth.

9. In a fluid tight socket for use with the cylinder of an internal combustion engine the combination of a cylinder comprising a liner and a separate water jacket, a recess formed in the water jacket in the bottom of which is a conical hole through the wall of the water jacket and through the contiguous wall of the liner, a hollow socket having a screw-threaded interior and its exterior formed partly conical to engage the hole through the walls of the liner and water jacket and partly cylindrical and screw-threaded the screw-threaded portion projecting into the recess in the water jacket and having a flat formed on it, a washer which surrounds the projecting portion of the socket and lies against the wall of the water jacket at the bottom of the recess the washer being shaped to engage the flat on the socket and having a projection which engages a hole in the wall of the water jacket adjacent to the washer, and a nut screw-threaded to engage the projecting portion of the socket and adapted to bear against the washer which lies beneath it so that when the nut is screwed up on the socket the latter will be drawn into the hole and the contiguous walls of the liner and water jacket will be clamped together as set forth.

In testimony whereof I have signed my name to this specification in the presence of two subscribing witnesses.

ARTHUR JOHN ROWLEDGE.

Witnesses:
B. E. DUNBAR KILBURN,
ARCHIBALD J. FRENCH.

Copies of this patent may be obtained for five cents each, by addressing the "Commissioner of Patents, Washington, D. C."